(12) United States Patent
Prathipati et al.

(10) Patent No.: US 12,268,906 B2
(45) Date of Patent: Apr. 8, 2025

(54) RETENTION ASSEMBLY FOR MASK STOWAGE CONTAINER

(71) Applicant: B/E AEROSPACE, INC., Winston Salem, NC (US)

(72) Inventors: Krishna Chaitanya Prathipati, Hyderabad (IN); Phani Kumar Saparapu, Hyderabad (IN); Kishore Manda, Hyderabad (IN); Ravindra Ramulu Kandukuri, Secunderabad (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 124 days.

(21) Appl. No.: 17/942,002

(22) Filed: Sep. 9, 2022

(65) Prior Publication Data

US 2023/0405373 A1 Dec. 21, 2023

(30) Foreign Application Priority Data

Jun. 15, 2022 (IN) .............................. 202241034196

(51) Int. Cl.
*A62B 25/00* (2006.01)
*A62B 7/00* (2006.01)
(Continued)

(52) U.S. Cl.
CPC ............ *A62B 25/00* (2013.01); *E05C 19/024* (2013.01); *B64D 2231/025* (2013.01)

(58) Field of Classification Search
CPC .................. A62B 25/00; A62B 25/005; B64D 2231/025; B64D 11/00; E05C 19/024; E05C 19/04; E05C 19/026; E05C 19/063; E05C 19/066; F16B 21/06; F16B 21/165; Y10T 292/0808
(Continued)

(56) References Cited

U.S. PATENT DOCUMENTS 1,973,971 A * 9/1934 West ...................... E05C 19/063
292/76
2,079,648 A * 5/1937 Aldeen ................. E05C 19/063
292/76
(Continued)

FOREIGN PATENT DOCUMENTS

WO 2016166352 10/2016

OTHER PUBLICATIONS

Lamp/Sugatsune Furniture and Architectural Harware Catalog No. 240A—pp. 246-247—Rotary Catch Item RC6900, 6901 https://digital-book.sugatsune.com/iportal/CatalogDetail.do?method=initial_screen&type=clcsr&volumeID=SGT00001&catalogID=790190000&designID=EXTEC (Year: 2022).*
(Continued)

*Primary Examiner* — Gideon R Weinerth
(74) *Attorney, Agent, or Firm* — SNELL & WILMER L.L.P.

(57) ABSTRACT

A mask stowage container is provided having a door panel coupled to a box via a securement mechanism, the securement mechanism having a striker having a neck and a protrusion, the striker mounted to the door panel, a holder, the holder including a first retainer and a second retainer, the striker configured to be laterally retained between the first retainer and the second retainer.

10 Claims, 4 Drawing Sheets

(51) Int. Cl.
*A62B 18/02* (2006.01)
*B64D 11/00* (2006.01)
*E05C 19/02* (2006.01)

(58) Field of Classification Search
USPC ............ 16/DIG. 32; 206/470; 292/146, 102, 292/103, 127, 129
See application file for complete search history.

(56) References Cited

U.S. PATENT DOCUMENTS

| | | | | |
|---|---|---|---|---|
| 2,376,325 A * | 5/1945 | Borchers | ............... | E05C 19/026 292/18 |
| 2,493,624 A * | 1/1950 | Gerson | ................. | E05C 19/063 292/76 |
| 2,749,163 A * | 6/1956 | Loeb | ...................... | E05C 19/063 292/17 |
| 2,833,583 A * | 5/1958 | Stone | .................... | E05C 19/026 292/18 |
| 2,837,361 A * | 6/1958 | Loeb | ........................ | E05C 19/04 292/18 |
| 2,946,612 A * | 7/1960 | Ahlgren | ................ | E05C 19/066 411/510 |
| 3,073,301 A * | 1/1963 | Hay | ........................ | F16K 31/44 251/74 |
| 3,647,165 A * | 3/1972 | Whitla | ................. | A62B 25/005 335/290 |
| 3,734,551 A * | 5/1973 | Hughes | ................. | E05C 19/066 292/17 |
| 4,023,874 A * | 5/1977 | Jong | ...................... | B64D 11/00 312/291 |
| 4,056,275 A * | 11/1977 | Keeler, II | .............. | E05C 19/066 292/17 |
| 4,289,238 A * | 9/1981 | Warncke | ................ | A62B 25/00 312/211 |
| 4,909,247 A * | 3/1990 | Terrisse | ............... | A62B 25/005 128/205.25 |
| 5,358,139 A * | 10/1994 | Schnoor | ................. | B64D 11/00 220/675 |
| 5,954,052 A * | 9/1999 | McDonald | ............. | B64D 10/00 206/485 |
| 6,526,967 B2 * | 3/2003 | Cordero | ................. | B64D 11/00 128/205.24 |
| 6,755,194 B2 | 6/2004 | Taieb | | |
| 7,309,045 B2 * | 12/2007 | Melberg | ................. | B64D 11/00 244/118.1 |
| 7,343,918 B2 * | 3/2008 | Martinez | .............. | A62B 25/005 128/205.13 |
| 8,100,439 B2 * | 1/2012 | Gerner | .................. | F25D 23/028 292/DIG. 16 |
| 8,863,744 B2 * | 10/2014 | Bachelard | ............. | B64D 10/00 128/205.24 |
| 9,004,403 B2 * | 4/2015 | Boomgaarden | ...... | A62B 25/005 220/675 |
| 2002/0020652 A1 | 2/2002 | Martinez | | |
| 2002/0189617 A1 * | 12/2002 | Cordero | ................. | B64D 10/00 128/205.25 |
| 2003/0010341 A1 * | 1/2003 | Martinez | ................... | A62B 7/14 128/204.26 |
| 2003/0188989 A1 * | 10/2003 | Taieb | .................... | A62B 25/005 220/827 |
| 2004/0144384 A1 * | 7/2004 | Martinez | .............. | A62B 25/005 128/204.29 |
| 2005/0225094 A1 * | 10/2005 | Lewis | ................. | E05B 17/0004 292/19 |
| 2006/0145003 A1 * | 7/2006 | Bardel | .................... | B64D 10/00 244/129.1 |
| 2008/0066760 A1 | 3/2008 | Pietrantoni et al. | | |
| 2008/0277946 A1 * | 11/2008 | Rudduck | ............. | E05B 47/0009 292/3 |
| 2010/0294885 A1 * | 11/2010 | Bloch | .................... | B64D 10/00 244/118.5 |
| 2014/0367976 A1 * | 12/2014 | Kshirsagar | ........... | A62B 25/005 292/336.3 |
| 2018/0001121 A1 * | 1/2018 | Sibuet | .................... | B64D 10/00 |
| 2020/0116136 A1 | 4/2020 | Naly et al. | | |
| 2020/0298029 A1 | 9/2020 | Murugesan et al. | | |

OTHER PUBLICATIONS

Sugatsune Catches & Latches Catalog p. 126—Rotary Catch Item 6900, 6901—Accessed Mar. 6, 2024 https://www.sugatsune.com/content/site-assets/201B_PDF/126.pdf (Year: 2024).*

European Patent Office, European Search Report dated Sep. 26, 2023 in Application No. 23179357.1.

* cited by examiner

RETENTION ASSEMBLY FOR MASK STOWAGE CONTAINER

CROSS-REFERENCE TO RELATED APPLICATIONS

This application claims priority to, and the benefit of, India Patent Application No. 202241034196, filed Jun. 15, 2022 (DAS Code BE20) and titled "RETENTION ASSEMBLY FOR MASK STOWAGE CONTAINER," which is incorporated by reference herein in its entirety for all purposes.

FIELD

The present disclosure relates to an aircrew mask stowage container, and more particularly to securement retainers for an aircrew mask stowage container.

BACKGROUND

Aircrew masks are configured to be worn by and deliver oxygen to an aircrew member (e.g., pilot or co-pilot) in the event of an emergency, or other scenario in which the pilot may need to be provided with oxygen. When not in use, the mask is typically stowed in a mask stowage container. The mask stowage container generally includes a door panel defining a mask opening. The mask opening is configured to allow the crewmember to grasp the mask and pull the mask from the stowage container. The doors of stowage container are biased toward a closed position. However, the doors may open inadvertently, for example, in response to acceleration and/or vibrations.

SUMMARY

In various embodiments, a mask stowage container is provided comprising a door panel coupled to a housing via a hinge, and a securement mechanism coupled to the door panel and the housing comprising a striker having a neck and a protrusion, the striker mounted to the door panel, a holder, the holder mounted to the housing and including a first retainer and a second retainer, the striker configured to be laterally retained between the first retainer and the second retainer.

In various embodiments, the mask stowage container is provided wherein the first retainer and the second retainer are coupled via a U shaped bracket.

In various embodiments, the mask stowage container is provided wherein the first retainer, the second retainer and the U shaped bracket are monolithic.

In various embodiments, the mask stowage container is provided wherein the first retainer, the second retainer and the U shaped bracket comprise an elastically deformable material.

In various embodiments, the mask stowage container is provided wherein the first retainer, the second retainer and the U shaped bracket comprise a thermoplastic.

In various embodiments, the mask stowage container is provided wherein the protrusion projects distally away from the door panel in a first direction.

In various embodiments, the mask stowage container is provided wherein the protrusion comprises a lateral width in a second direction, the second direction orthogonal to the first direction, wherein the lateral width increases along the first direction to a maximum lateral width.

In various embodiments, the mask stowage container is provided wherein the lateral width decreases along the first direction past the maximum lateral width.

In various embodiments, the mask stowage container is provided wherein the holder is mounted to the housing.

In various embodiments, the mask stowage container is provided wherein the first retainer defines a cylindrical geometry and wherein the second retainer defines a cylindrical geometry.

In various embodiments, the mask stowage container is provided wherein the neck has a neck lateral width less than the maximum lateral width.

In various embodiments, a securement mechanism is provided comprising a striker having a neck and a protrusion, the protrusion configured to be laterally retained by a holder, the holder, the holder including a first retainer and a second retainer.

In various embodiments, the securement mechanism is provided wherein the first retainer and the second retainer are coupled via a U shaped bracket.

In various embodiments, the securement mechanism is provided wherein the first retainer, the second retainer and the U shaped bracket are monolithic.

In various embodiments, the securement mechanism is provided wherein the first retainer, the second retainer and the U shaped bracket comprise an elastically deformable material.

In various embodiments, the securement mechanism is provided wherein the first retainer, the second retainer and the U shaped bracket comprise a thermoplastic.

In various embodiments, the securement mechanism is provided wherein the first retainer defines a cylindrical geometry and wherein the second retainer defines a cylindrical geometry.

In various embodiments, the securement mechanism is provided wherein the neck has a lateral width less than a maximum lateral width of the protrusion.

In various embodiments, a method of manufacturing a mask stowage container is provided comprising coupling a striker to a door panel, and coupling a holder to a housing.

In various embodiments, a method of manufacturing a mask stowage container further includes disposing the striker between a first retainer and a second retainer of the holder.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

One or more securement mechanisms, as described herein, may be located between a door and the housing of a mask stowage container. The one or more securement mechanisms may be configured to prevent or reduce unintentional opening of the doors, for example, opening due to vibration.

Figure 1:
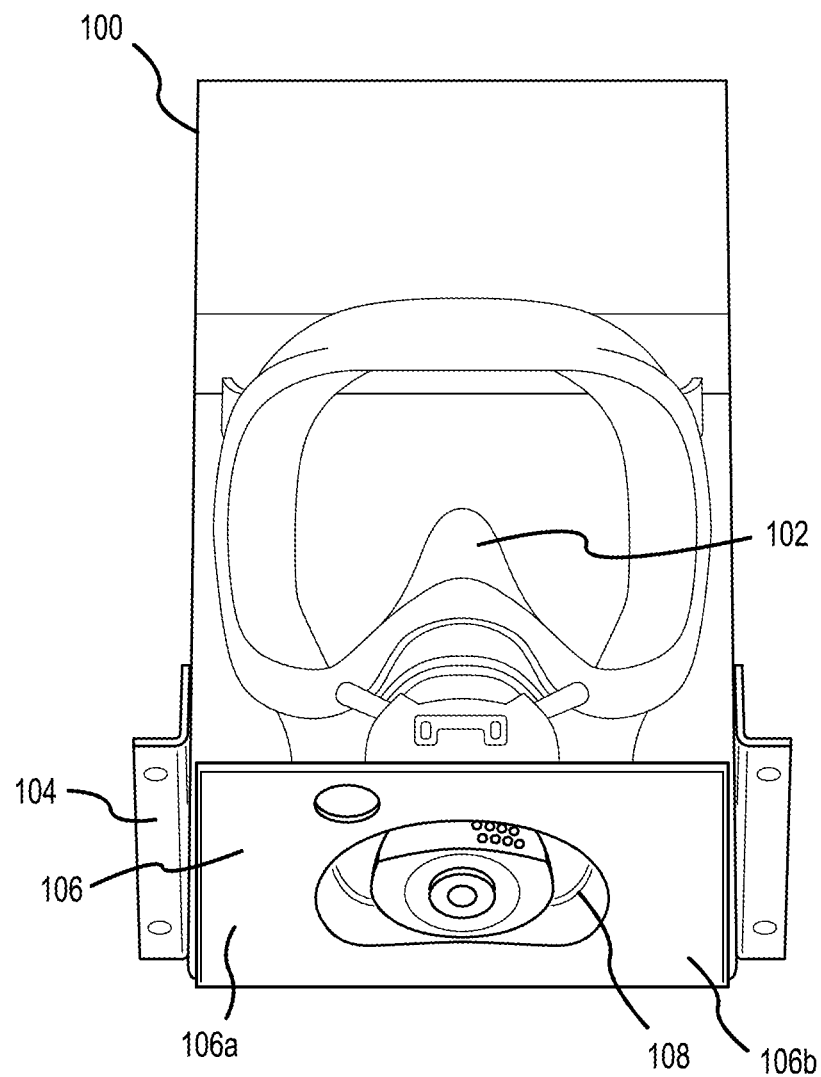
FIG. 1 illustrates a perspective view of a mask stowage container, in accordance with various embodiments.
Figure 4:
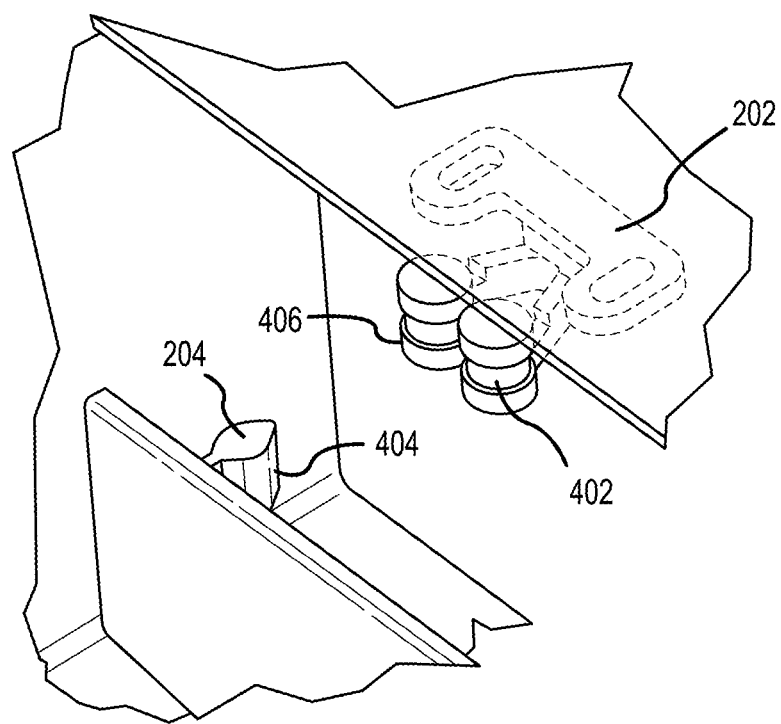
FIG. 4 illustrates a magnified view of a securement mechanism of a mask stowage container in an unsecured position, in accordance with various embodiments.

Referring to FIG. 1, mask stowage container 100 for an oxygen mask 102 is illustrated, in accordance with various embodiments. Mask stowage container 100 may include a housing 104. Housing 104 defines a volume configured to receive and house oxygen mask 102. Oxygen mask 102 may be configured to provide oxygen to an aircraft crew member (e.g., a pilot, copilot, flight attendant or other crewmember). Door assembly 106 may comprise door panel 106a and door panel 106b. Door assembly 106 may be coupled to housing 104, either fixedly or via one or more hinges. Stated differently, door panel 106a and door panel 106b may each include one or more hinge joints 114a and 114b configured to allow door panel 106a and door panel 106b to be pivoted (or rotated) relative to housing 104. Stated differently, door panel 106a and door panel 106b may pivot between a closed position (FIG. 1A) and an open position (FIG. 4).

In the closed position, door panel 106a and door panel 106b may be secured to housing 104 via securement mechanisms 210a and 210b (with momentary reference to FIG. 2), respectively, thereby preventing door panel 106a and door panel 106b from pivoting, or rotating, to the open position inadvertently. Hinge joints 114a and 114b may be spring loaded and biased to urge door panel 106a and door panel 106b into a closed position. Securement mechanisms 210a and 210b, while reducing or eliminating the risk of inadvertent door panel opening due to vibrations, may, nonetheless, allow easy, rapid deployment so that oxygen mask 102 may be removed from mask stowage container 100 in a short period of time. Rapid deployment improves safety of crewmembers who may be in need of oxygen mask 102 for the delivery of life sustaining oxygen.

Figure 2:
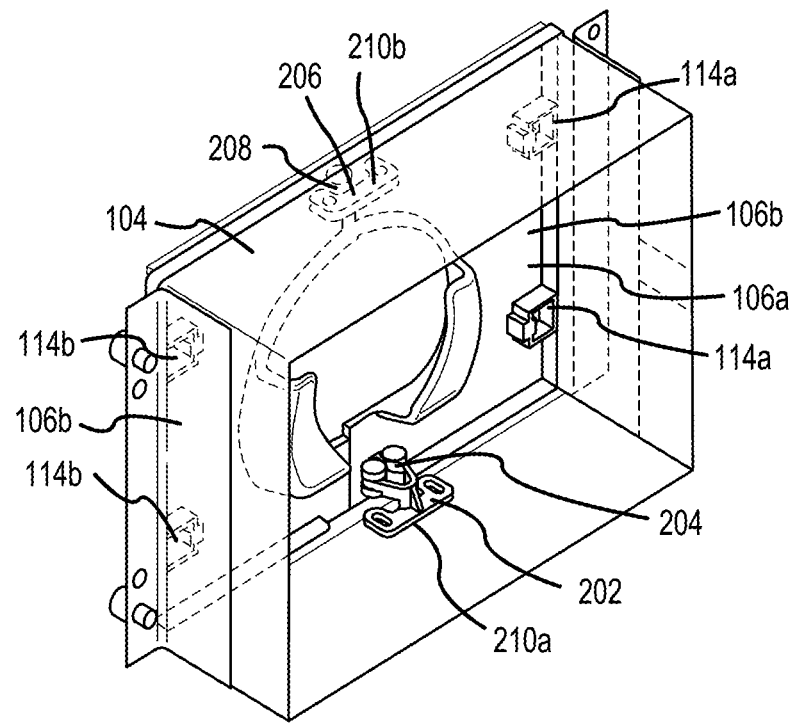
FIG. 2 illustrates a cut away view of a mask stowage container, in accordance with various embodiments.

With reference to FIG. 2, mask stowage container 100 is shown from a different perspective. Securement mechanisms 210a and 210b are illustrated retaining door panel 106a and door panel 106b, respectively, relative to housing 104. Without securement mechanisms 210a and 210b, door panel 106a and door panel 106b would be free to pivot via hinge joints 114a and 114b.

Securement mechanisms 210a and 210b are illustrated as having the same features, though in various embodiments, securement mechanisms 210a and 210b may take different configurations from one another. Securement mechanisms 210a comprises striker 204 and holder 202. Securement mechanisms 210b comprises striker 208 and holder 206. Striker 204 may be mounted to or coupled with door panel 106a. Striker 208 may be mounted to or coupled with door panel 106b. In various embodiments, striker 204 is monolithic to door panel 106a. In various embodiments, striker 208 is monolithic to door panel 106b. Holder 202 and holder 206 are mounted to housing 104.

Figure 3:
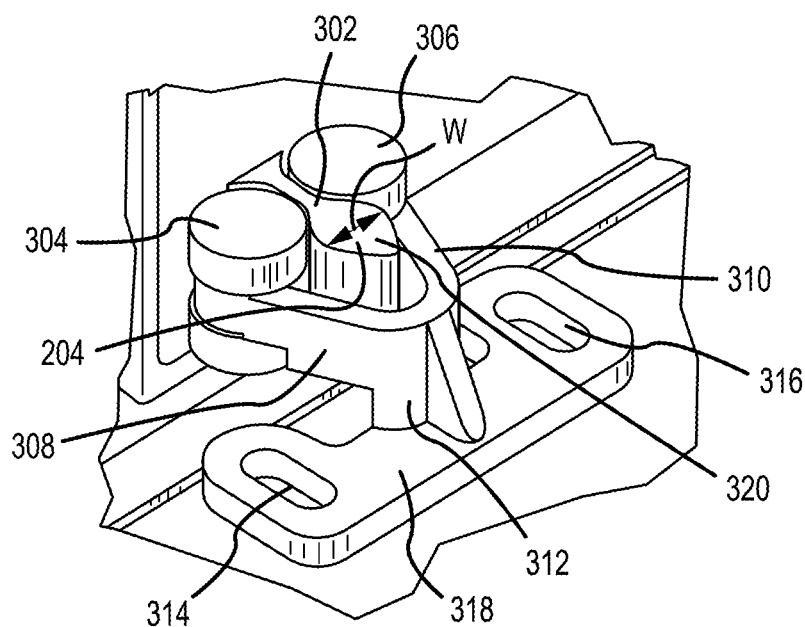
FIG. 3 illustrates a magnified view of a securement mechanism of a mask stowage container, in accordance with various embodiments.

With reference to FIG. 3, holder 202 is shown from FIG. 2 in a magnified view. As discussed above, holder 206 shares the same features as holder 202. Holder 202 comprises base 318 mounting apertures 314 and 316. A fastener may be passed through aperture 314 to couple housing 104 to holder 202. A fastener may be passed through aperture 316 to couple housing 104 to holder 202. In various embodiments, an adhesive is used to fix holder 202 to housing 104. Any suitable fastener may be used, including rivets, screws, bolts, nuts, and other like fasteners.

Base 318 comprises vertical support 312. Vertical support 312 extends away from base 318 and acts to support U shaped bracket 308. U shaped bracket 308 comprises first retainer 304 and second retainer 306. In various embodiments, U shaped bracket 308, first retainer 304, vertical support 312, second retainer 306, and base 318 are monolithic to one another. However, in various embodiments, base 318 may be welded or otherwise joined to vertical support 312. Moreover, in further embodiments, base 318 and vertical support 312 may be welded or otherwise coupled to U shaped bracket 308.

First retainer 304 and second retainer 306 are coupled to U shaped bracket 308 such that a force acting to laterally separate first retainer 304 and second retainer 306 is resisted by U shaped bracket 308. A force acting to laterally separate first retainer 304 and second retainer 306 may cause U shaped bracket 308 to elastically deform. However, as the force lessens, the U shaped bracket 308 may begin to return to its original shape, reducing the lateral separation of first retainer 304 and second retainer 306.

First retainer 304 and second retainer 306 may comprise any suitable geometry and are illustrated as having cylindrical geometries. However, first retainer 304 and second retainer 306 may be spherical, cubic, pyramidal, or other suitable geometry. With momentary reference to FIG. 4, first retainer 304 and second retainer 306 comprise textured surfaces 402 and 406, respectively. Textured surfaces 402 and 406, may comprises a knurled or roughened surface to assist in retention of striker 204. In various embodiments, however, textured surfaces 402 and 406 are omitted. Striker 204 may similarly comprises textured surface 404 which a knurled or roughened surface, though in various embodiments textured surface 404 is omitted.

U shaped bracket 308, first retainer 304, vertical support 312, second retainer 306, and base 318 may comprise a monolithic piece of an elastically deformable material. In various embodiments, U shaped bracket 308, first retainer 304, vertical support 312, second retainer 306, and base 318 may comprise a monolithic piece of plastic, for example, a thermoplastic or thermoset.

As discussed above, striker 204 shares the same features as striker 208. Striker 204 comprises neck 302 and protrusion 320. Neck 302 has a lateral width less than a maximum lateral width W of protrusion 320. In that regard, protrusion 320 may be sized and shaped to have a lateral width that increases distal to the neck 302 to reach a maximum lateral width W. However, as one moves distally on protrusion 320 past maximum lateral width W, lateral width may decrease. Various cross sectional geometries may be used in this regard.

Adding reference to FIG. 4, door panel 106a is shown in an open position. In this regard, striker 204 is not in contact with holder 202.

In use, from an open position, door panel 106a may pivot toward housing 104, bringing striker 204 into contact with holder 202. The most distal portion of striker 204 contacts first retainer 304 and second retainer 306. As striker 204 is urged against first retainer 304 and second retainer 306, the geometry of protrusion 320 forces first retainer 304 and second retainer 306 laterally apart from one another. As striker 204 is urged past maximum lateral width W, the force exerted by U shaped bracket 308 urges first retainer 304 and second retainer 306 laterally together, returning to the shape first retainer 304 and second retainer 306 had prior to interaction with striker 204. In that regard, first retainer 304 and second retainer 306 approach neck 302. In various embodiments, first retainer 304 and second retainer 306 contact neck 302, though in various embodiments, first retainer 304 and second retainer 306 do not contact neck 302. However, if door panel 106a is rotated away from housing 104, protrusion 320 contact first retainer 304 and second retainer 306, resisting motion until sufficient force is used to begin to laterally separate first retainer 304 and second retainer 306 and free striker 204 from the first retainer 304 and second retainer 306. In this manner, securement mechanism 210a may prevent vibration and other minor forces from opening door panel 106a while allowing a crew member in need of oxygen mask 102 to exert additional force to open door panel 106a.

Figure 5:
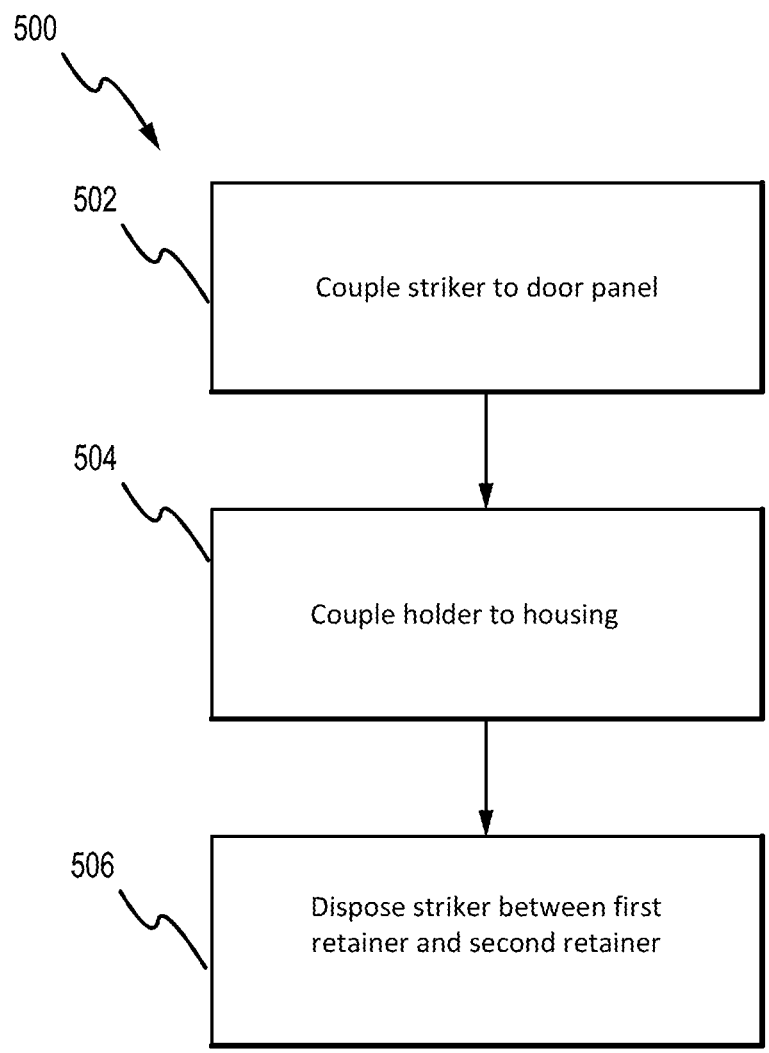
FIG. 5 illustrates a method of assembly of a mask stowage container, in accordance with various embodiments.

With reference to FIG. 5, method of manufacturing a mask stowage container 500 is shown. In step 502, a striker is coupled to a door panel. In step 504, a holder is coupled to a housing. In step 506, a striker is disposed between a first retainer and a second retainer of the holder.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mask stowage container comprising:
    a housing;
    a door assembly, the door assembly comprising a first door panel and a second door panel that define a mounting structure configured to retain an oxygen mask;
    a first spring-biased hinge joint connecting the first door panel to the housing;
    a second spring-biased hinge joint connecting the second door panel to the housing; and
    a plurality of securement mechanisms, wherein a first securement mechanism of the plurality of securement mechanisms is coupled to the first door panel and the housing, wherein a second securement mechanism of the plurality of securement mechanisms is coupled to the second door panel and the housing, wherein each of the first securement mechanism and the second securement mechanism comprises a striker and a holder, and wherein the plurality of securement mechanisms prevent an inadvertent opening of the door assembly due to at least one of vibration or acceleration.

2. The mask stowage container of claim 1, wherein the first securement mechanism comprises a first striker and a first holder, wherein the first striker comprises a first neck and a first protrusion, wherein the first striker is mounted to the first door panel; wherein the first holder is mounted to the housing and includes a first first retainer and a first second retainer, the first striker configured to be laterally retained between the first first retainer and the first second retainer, wherein the first first retainer and the first second retainer are coupled via a first U shaped bracket, wherein the second securement mechanism a second striker and a second holder, wherein the second striker comprises a second neck and a second protrusion, wherein the second striker is mounted to the second door panel; wherein the second holder is mounted to the housing and includes a second first retainer and a second second retainer, the second striker configured to be laterally retained between the second first retainer and the second second retainer, and wherein the second first retainer and the second second retainer are coupled via a second U shaped bracket.

3. The mask stowage container of claim 2, wherein the first first retainer, the first second retainer and the first U shaped bracket are monolithic and wherein the second first retainer, the second second retainer and the second U shaped bracket are monolithic.

4. The mask stowage container of claim 3, wherein the first first retainer, the first second retainer and the first U shaped bracket comprise an elastically deformable material and wherein the second first retainer, the second second retainer and the second U shaped bracket comprise an elastically deformable material.

5. The mask stowage container of claim 4, wherein the first first retainer, the first second retainer and the first U shaped bracket comprise a thermoplastic and wherein the second first retainer, the second second retainer and the second U shaped bracket comprise a thermoplastic.

6. The mask stowage container of claim 5, wherein the first first retainer defines a cylindrical geometry, wherein the first second retainer defines a cylindrical geometry, wherein the second first retainer defines a cylindrical geometry, and wherein second first second retainer defines a cylindrical geometry.

7. The mask stowage container of claim 2, wherein the first protrusion projects distally away from the first door panel in a first direction and wherein the second protrusion projects distally away from the second door panel in a first direction.

8. The mask stowage container of claim 7, wherein the first protrusion comprises a lateral width in a second direction, wherein the second protrusion comprises the lateral width in the second direction, the second direction orthogonal to the first direction, wherein the lateral width increases along the first direction to a maximum lateral width.

9. The mask stowage container of claim 8, wherein the lateral width decreases along the first direction past the maximum lateral width.

10. The mask stowage container of claim 9, wherein the first neck has a neck lateral width less than the maximum lateral width and wherein the second neck has the neck lateral width less than the maximum lateral width.

\* \* \* \* \*